United States Patent
Komuro

(10) Patent No.: US 11,628,862 B2
(45) Date of Patent: Apr. 18, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Misa Komuro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 237 days.

(21) Appl. No.: 17/069,918

(22) Filed: Oct. 14, 2020

(65) Prior Publication Data
US 2021/0114621 A1 Apr. 22, 2021

(30) Foreign Application Priority Data
Oct. 18, 2019 (JP) .............................. JP2019-191023

(51) Int. Cl.
*B60W 60/00* (2020.01)
*G08G 1/16* (2006.01)
(Continued)

(52) U.S. Cl.
CPC ........ *B60W 60/0015* (2020.02); *B60W 10/20* (2013.01); *B60W 30/09* (2013.01);
(Continued)

(58) Field of Classification Search
CPC .. B60W 60/0015; B60W 10/20; B60W 30/09; B60W 30/0953; B60W 30/0956;
(Continued)

(56) References Cited

U.S. PATENT DOCUMENTS

2008/0097699 A1* 4/2008 Ono ................... B62D 15/0265
701/300
2011/0210866 A1* 9/2011 David .................... G08G 1/166
340/901
(Continued)

FOREIGN PATENT DOCUMENTS

JP 2008-003762 1/2008
JP 2011-197781 10/2011
(Continued)

OTHER PUBLICATIONS

Japanese Office Action for Japanese Patent Application No. 2019-191023 dated Nov. 15, 2022.

*Primary Examiner* — Jason Holloway
(74) *Attorney, Agent, or Firm* — Amin, Turocy & Watson, LLP

(57) ABSTRACT

A vehicle control device includes a recognizer configured to recognize a surrounding environment of a vehicle including a moving object present around the vehicle and a controller configured to control at least one of a speed and steering of the vehicle. The controller restricts access to the moving object when the moving object is rotating around a vertical axis at a speed greater than or equal to a threshold value so that a front surface of the moving object recognized by the recognizer faces a position interfering with a position in a traveling direction of the vehicle as compared with when the moving object is not rotating.

4 Claims, 16 Drawing Sheets

(51) Int. Cl.
    *B60W 30/095*     (2012.01)
    *B60W 30/09*      (2012.01)
    *B60W 10/20*      (2006.01)
    *B60W 30/14*      (2006.01)
(52) U.S. Cl.
    CPC .... *B60W 30/0953* (2013.01); *B60W 30/0956* (2013.01); *B60W 30/143* (2013.01); *G08G 1/166* (2013.01); *B60W 2420/42* (2013.01); *B60W 2420/50* (2013.01); *B60W 2554/4029* (2020.02)
(58) Field of Classification Search
    CPC ........... B60W 30/143; B60W 2420/42; B60W 2420/50; B60W 2554/4029; B60W 2420/52; B60W 2556/50; G08G 1/166
    See application file for complete search history.

(56) References Cited

U.S. PATENT DOCUMENTS

| | | | | |
|---|---|---|---|---|
| 2014/0236386 A1* | 8/2014 | Yoshizawa | ............ | B60W 30/08 701/1 |
| 2019/0266859 A1* | 8/2019 | Song | ................... | G05D 1/0248 |
| 2021/0241000 A1* | 8/2021 | Pfeiffer | ................. | G06V 20/64 |

FOREIGN PATENT DOCUMENTS

| | | |
|---|---|---|
| WO | 2016/098238 | 6/2016 |
| WO | 2017/056382 | 4/2017 |

* cited by examiner

ABSTRACT# VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-191023, filed Oct. 18, 2019, the content of which is incorporated herein by reference.

BACKGROUND

Field of the Invention

The present invention relates to a vehicle control device, a vehicle control method, and a storage medium.

Description of Related Art

In recent years, research has been conducted on automatedly controlling vehicles. A device for setting risk potential of a host vehicle in a direction opposite to a movement direction of a moving object to be lower when the moving object is closer to an end of a passing section while the moving object around the vehicle is moving in a predetermined passing section has been disclosed (Japanese Unexamined Patent Application, First Publication No. 2011-197781).

Although the above-described device sets the risk potential in accordance with the movement of the moving object, there may be a case in which it is difficult to accurately set the risk potential. Thus, the above-described device may not be able to appropriately control the vehicle on the basis of the movement of the moving object.

SUMMARY

The present invention has been made in consideration of such circumstances and an objective of the present invention is to provide a vehicle control device, a vehicle control method, and a storage medium capable of reliably controlling a vehicle according to a surrounding situation.

A vehicle control device, a vehicle control method, and a storage medium according to the present invention adopt the following configurations.

(1): According to a first aspect of the present invention, a vehicle control device is provided including: a recognizer configured to recognize a surrounding environment of a vehicle including a moving object present around the vehicle; and a controller configured to control at least one of a speed and steering of the vehicle, wherein the controller restricts access to the moving object when the moving object is rotating around a vertical axis at a speed greater than or equal to a threshold value so that a front surface of the moving object recognized by the recognizer faces a position interfering with a position in a traveling direction of the vehicle as compared with when the moving object is not rotating around the vertical axis at a speed greater than or equal to a threshold value.

(2): In a second aspect of the present invention in accordance with the first aspect, the vehicle control device further includes a setter configured to set a risk area in a surrounding area of the vehicle on the basis of a recognition result of the recognizer, wherein the setter sets a first risk area with respect to the moving object when the moving object is rotating toward a reference position present in the traveling direction of the vehicle at a speed less than the threshold value or is not rotating toward the reference position, wherein the setter sets a second risk area larger than the first risk area with respect to the moving object when the moving object is rotating toward the reference position present in the traveling direction of the vehicle at a speed greater than or equal to the threshold value, and wherein the controller controls the vehicle so that the vehicle does not access the first risk area or the second risk area.

(3): In a third aspect of the present invention in accordance with the first aspect or the second aspect, the vehicle control device further includes a setter configured to set a risk area in a surrounding area of the vehicle on the basis of a recognition result of the recognizer, wherein the setter sets a first risk area associated with first risk potential with respect to the moving object when the moving object is rotating toward a reference position present in the traveling direction of the vehicle at a speed less than the threshold value or is not rotating toward the reference position, wherein the setter sets a second risk area associated with second risk potential greater than the first risk potential with respect to the moving object when the moving object is rotating toward the reference position present in the traveling direction of the vehicle at a speed greater than or equal to the threshold value, and wherein the controller controls the vehicle so that the vehicle does not access the first risk area or the second risk area.

(4): In a fourth aspect of the present invention in accordance with the second aspect or the third aspect, the setter sets the first risk area and the second risk area so that the first risk area and the second risk area extend in at least a direction interfering with the position in the traveling direction of the vehicle.

(5): In a fifth aspect of the present invention in accordance with the first aspect to the fourth, the controller further restricts the access of the vehicle to the moving object in consideration of at least one of a type of the moving object, a rotation direction of the moving object, and a physical object present in the rotation direction of the moving object when the moving object is rotating around the vertical axis at a speed greater than or equal to the threshold value so that the front surface of the moving object faces the position interfering with the position in the traveling direction of the vehicle, as compared with when the moving object is not rotating around the vertical axis at a speed greater than or equal to the threshold value.

(6): According to a sixth aspect of the present invention, there is provided a vehicle control method including: recognizing, by a computer, a surrounding environment of a vehicle including a moving object present around the vehicle; controlling, by the computer, at least one of a speed and steering of the vehicle; and restricting, by the computer, access to the moving object when the moving object is rotating around a vertical axis at a speed greater than or equal to a threshold value so that a front surface of the moving object that has been recognized faces a position interfering with a position in a traveling direction of the vehicle as compared with when the moving object is not rotating around the vertical axis at a speed greater than or equal to a threshold value.

(7): According to a seventh aspect of the present invention, there is provided a storage medium storing a program for causing a computer to: recognize a surrounding environment of a vehicle including a moving object present around the vehicle; control at least one of a speed and steering of the vehicle; and restrict access to the moving object when the moving object is rotating around a vertical axis at a speed greater than or equal to a threshold value so that a front surface of the moving object that has been recognized faces a position interfering with a position in a traveling direction of the vehicle as compared with when the moving object is not rotating around the vertical axis at a speed greater than or equal to a threshold value.

According to the first aspects to the seventh aspect, it is possible to reliably control a vehicle according to a surrounding situation. In particular, the vehicle control device can control the vehicle while paying sufficient attention to a moving object that is likely to have access in a direction in which the moving object will interfere with the host vehicle M by making a sudden direction change.

According to the second aspect or the third aspect, when the rotational speed is greater than or equal to the threshold value, the controller can implement the control in consideration of the moving object by setting the second risk area.

According to the sixth aspect, the controller can reliably implement control according to characteristics of the moving object by restricting the access to the moving object in consideration of at least one of a type of the moving object, a rotation direction of the moving object, and a physical object present in the rotation direction of the moving object.

DETAILED DESCRIPTION

Hereinafter, embodiments of a vehicle control device, a vehicle control method, and a storage medium according to the present invention will be described with reference to the drawings. Although a case in which left-hand traffic regulations are applied will be described below, it is only necessary to reverse the left and right when right-hand traffic regulations are applied. As used throughout this disclosure, the singular forms "a," "an," and "the" include plural reference unless the context clearly dictates otherwise.

[Overall Configuration]

Figure 1:
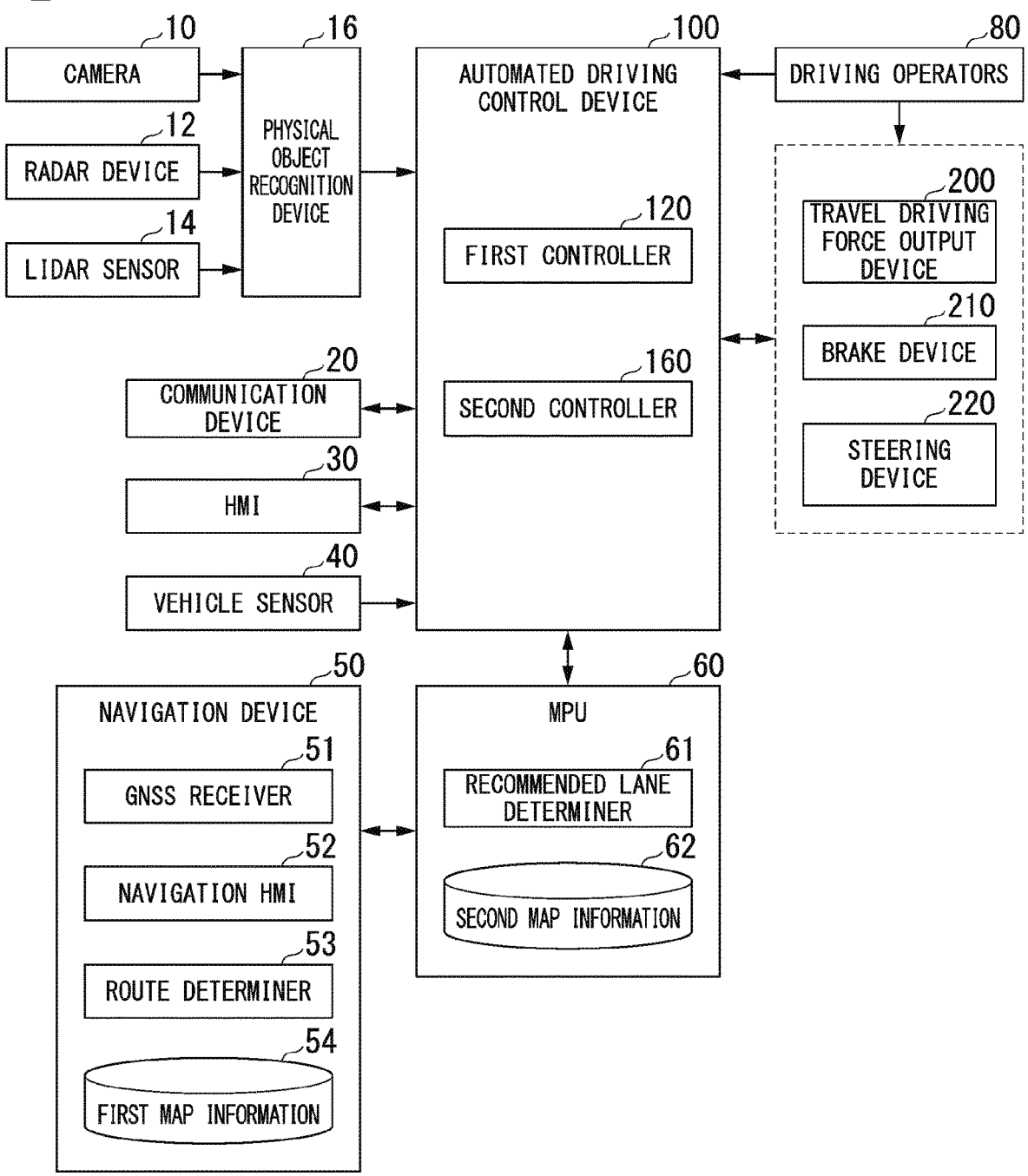
FIG. 1 is a configuration diagram of a vehicle system 1 using a vehicle control device according to an embodiment.

FIG. 1 is a configuration diagram of a vehicle system 1 using a vehicle control device according to an embodiment. For example, a vehicle in which the vehicle system 1 is mounted is a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power generated by an electric power generator connected to the internal combustion engine or electric power with which a secondary cell or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operators 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and parts of the configuration may be omitted or other configurations may be further added.

For example, the camera 10 is a digital camera using a solid-state imaging element such as a charge coupled device (CCD) or a complementary metal oxide semiconductor (CMOS). The camera 10 is attached to any location on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object on the basis of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle present in the vicinity of the host vehicle M, or communicates with various types of server devices via a radio base station, using, for example, a cellular network or a Wi-Fi network, Bluetooth (registered trademark), dedicated short range communication (DSRC), or the like.

The HMI 30 presents various types of information to an occupant of the host vehicle M and receives an input operation by the occupant. The HMI 30 includes various types of display devices, a speaker, a buzzer, a touch panel, a switch, keys and the like.

The vehicle sensor 40 includes a vehicle speed sensor configured to detect the speed of the host vehicle M, an acceleration sensor configured to detect acceleration, a yaw rate sensor configured to detect angular velocity around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines in what lane numbered from the left the vehicle will travel. The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

For example, the driving operators 80 include an accelerator pedal, a brake pedal, a shift lever, a steering wheel, a steering wheel variant, a joystick, and other operators. A sensor configured to detect an amount of operation or the presence or absence of an operation is attached to the driving operator 80, and a detection result thereof is output to the automated driving control device 100 or some or all of the travel driving force output device 200, the brake device 210, and the steering device 220.

The automated driving control device 100 includes, for example, a first controller 120 and a second controller 160. Each of the first controller 120 and the second controller 160 is implemented, for example, by a hardware processor such as a central processing unit (CPU) executing a program (software). Some or all of these components are implemented by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The automated driving control device 100 is an example of a "vehicle control device" and the combination of an action plan generator 140 and the second controller 160 is an example of a "controller."

Figure 2:
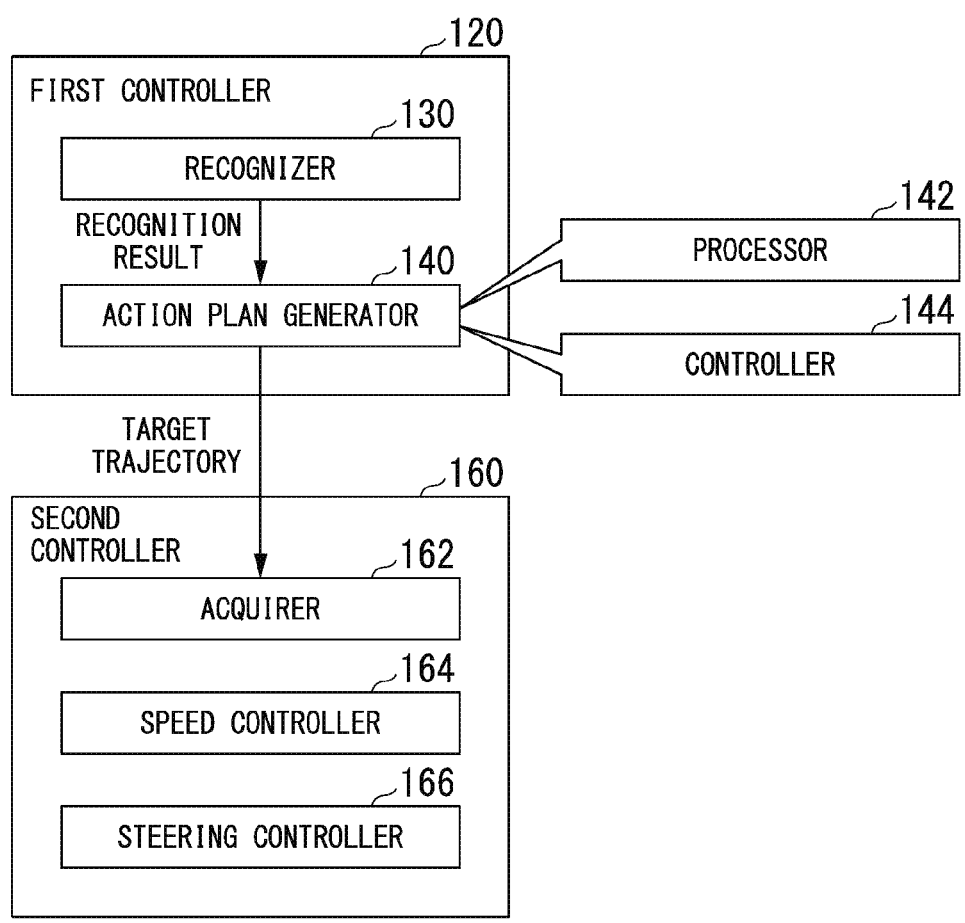
FIG. 2 is a functional configuration diagram of a first controller and a second controller.

FIG. 2 is a functional configuration diagram of the first controller 120 and the second controller 160. The first controller 120 includes, for example, a recognizer 130, and the action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is ensured.

The recognizer 130 recognizes states of a position, a speed, acceleration, and the like of a physical object around the host vehicle M on the basis of information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane in which the host vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the host vehicle M recognized from an image captured by the camera 10. The recognizer 130 may recognize a travel lane by recognizing a traveling path boundary (a road boundary) including a road dividing line, a road shoulder, a curb, a median strip, a guardrail, or the like as well as a road dividing line. In this recognition, a position of the host vehicle M acquired from the navigation device 50 or a processing result of the INS may be added. The recognizer 130 recognizes a temporary stop line, an obstacle, red traffic light, a toll gate, and other road events.

When the travel lane is recognized, the recognizer 130 recognizes a position or orientation of the host vehicle M with respect to the travel lane. For example, the recognizer 130 may recognize a gap of a reference point of the host vehicle M from the center of the lane and an angle formed with respect to a line connecting the center of the lane in the traveling direction of the host vehicle M as a relative position and orientation of the host vehicle M related to the travel lane. Alternatively, the recognizer 130 may recognize a position of the reference point of the host vehicle M related to one side end portion (a road dividing line or a road boundary) of the travel lane or the like as a relative position of the host vehicle M related to the travel lane.

The action plan generator 140 generates a future target trajectory along which the host vehicle M is allowed to automatedly travel (independently of a driver's operation) in the traveling aspect defined by the event so that the host vehicle M can generally travel in the recommended lane determined by the recommended lane determiner 61 and further cope with a surrounding situation of the host vehicle M. For example, the target trajectory includes a speed element. For example, the target trajectory is represented by sequentially arranging points (trajectory points) at which the host vehicle M is required to arrive. The trajectory point is a point at which the host vehicle M is required to arrive for each predetermined traveling distance (for example, about several meters [m]). On the other hand, a target speed and target acceleration for each predetermined sampling time period (for example, about several tenths of a second [sec]) are generated as parts of the target trajectory. The trajectory point may be a position at which the host vehicle M is required to arrive at the sampling time for each predetermined sampling time period. In this case, information of the target speed or the target acceleration is represented by an interval between trajectory points.

The action plan generator 140 may set an automated driving event when the target trajectory is generated. Automated driving events include a constant-speed traveling event, a low-speed tracking traveling event, a lane change event, a branching event, a merging event, a takeover event, and the like. The action plan generator 140 generates a target trajectory according to an activated event.

The action plan generator 140 includes, for example, a processor 142 and a controller 144. Details of the processes of the processor 142 and the controller 144 will be described below. The processor 142 is an example of a "setter."

The second controller 160 controls the travel driving force output device 200, the brake device 210, and the steering device 220 so that the host vehicle M passes through the target trajectory generated by the action plan generator 140 at a scheduled time.

Returning to FIG. 2, the second controller 160 includes, for example, an acquirer 162, a speed controller 164, and a steering controller 166. The acquirer 162 acquires information of a target trajectory (trajectory points) generated by the action plan generator 140 and causes a memory (not shown) to store the acquired information. The speed controller 164 controls the travel driving force output device 200 or the brake device 210 on the basis of speed elements associated with the target trajectory stored in the memory. The steering controller 166 controls the steering device 220 in accordance with a level of curvature of the target trajectory stored in the memory. For example, processes of the speed controller 164 and the steering controller 166 are implemented by a combination of feed-forward control and feedback control. As an example, the steering controller 166 executes feed-forward control according to the curvature of the road in front of the host vehicle M and feedback control based on deviation from the target trajectory in combination.

The travel driving force output device 200 outputs a travel driving force (torque) for enabling the vehicle to travel to driving wheels. For example, the travel driving force output device 200 may include a combination of an internal combustion engine, an electric motor, a transmission, and the like, and a power electronic control unit (ECU) that controls the internal combustion engine, the electric motor, the transmission, and the like. The ECU controls the above-described components in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operator 80 so that brake torque according to a braking operation is output to each wheel. The brake device 210 may include a mechanism configured to transfer the hydraulic pressure generated by an operation of the brake pedal included in the driving operators 80 to the cylinder via a master cylinder as a backup. The brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operator 80 to cause the direction of the steerable wheels to be changed.

[Specific Control (Part 1)]

The controller 144 restricts access to a moving object when the moving object is rotating around a vertical axis at a speed greater than or equal to a threshold value so that a front surface of the moving object recognized by the recognizer 130 faces a position interfering with a position in a traveling direction of the host vehicle M (a traveling destination of the host vehicle M), as compared with when the moving object is not rotating. Hereinafter, the above-described control may be referred to as "specific control."

The "moving object" includes a person, an animal, and the like. The moving object includes a pedestrian, a bicycle, a wheelchair, and the like. In the following description, it is assumed that the moving object is a pedestrian. The "front surface of the moving object" is a reference surface of the moving object. When the moving object is a pedestrian, for example, the "front surface of the moving object" is the chest, the face, or the like of the pedestrian.

For example, "facing a position interfering with a position in a traveling direction of the host vehicle M" indicates that the moving object is directed in a trajectory direction of a traveling destination of the host vehicle M. For example, "facing a position (hereinafter referred to as a reference position) interfering with a position in the traveling direction of the host vehicle M" indicates that the moving object is directed in a roadway direction when the moving object is present on the sidewalk. "Restricting access to the moving object" indicates that the controller 144 restricts the speed of the host vehicle M or causes the host vehicle M to travel at a position away from the moving object.

Figure 3:
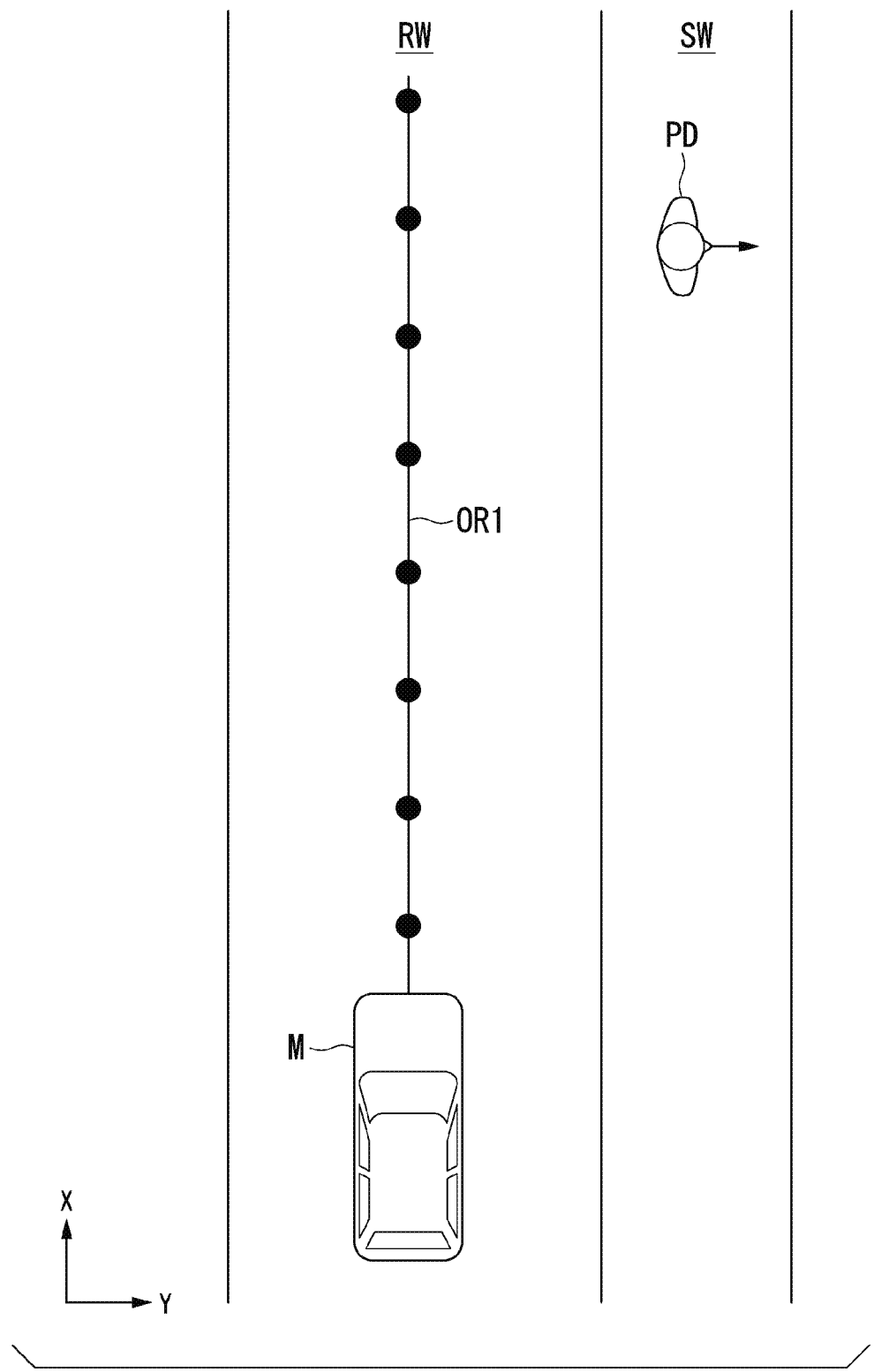
FIG. 3 is a diagram (part 1) for describing specific control.

FIG. 3 is a diagram (part 1) for describing specific control. For example, it is assumed that the host vehicle M is traveling on a roadway RW in an X direction and a pedestrian PD is present on a sidewalk SW. The pedestrian PD is directed in a Y direction orthogonal to the X direction. The host vehicle M is scheduled to travel along a scheduled trajectory OR1.

Figure 4:
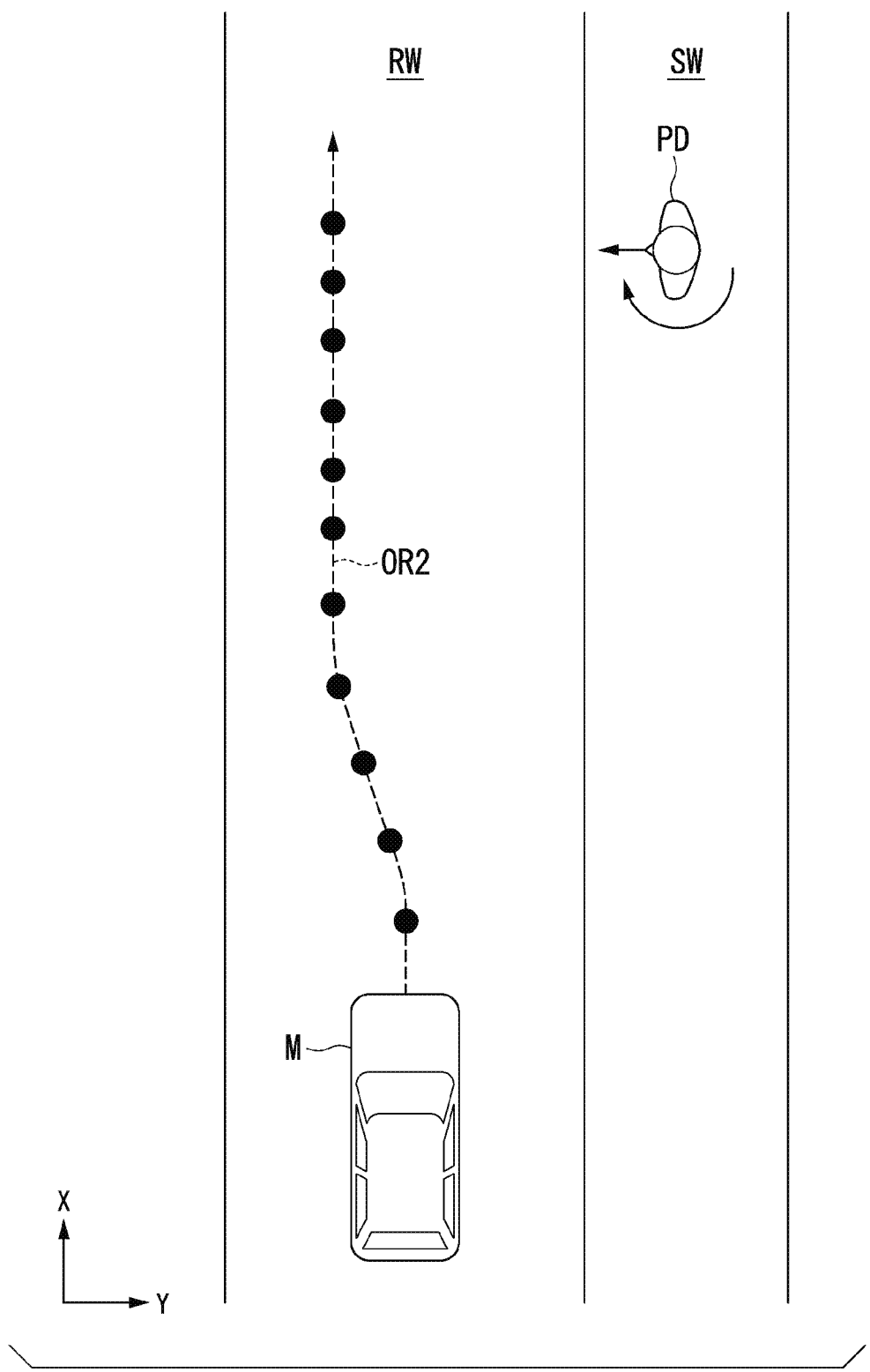
FIG. 4 is a diagram (part 2) for describing specific control.

FIG. 4 is a diagram (part 2) for describing specific control. When the pedestrian PD has rotated toward the reference position, the controller 144 controls the host vehicle M on the basis of a rotational speed. For example, the controller 144 restricts the speed of the host vehicle M when the moving object is rotating toward the reference position at a speed greater than or equal to the threshold value. When the moving object is rotating toward the reference position at a speed greater than or equal to the threshold value, the controller 144 may change a scheduled traveling trajectory in addition to (or in place of) restricting the speed of the host vehicle M. In this case, the host vehicle M travels, for example, at a position away from the moving object.

Figure 5:
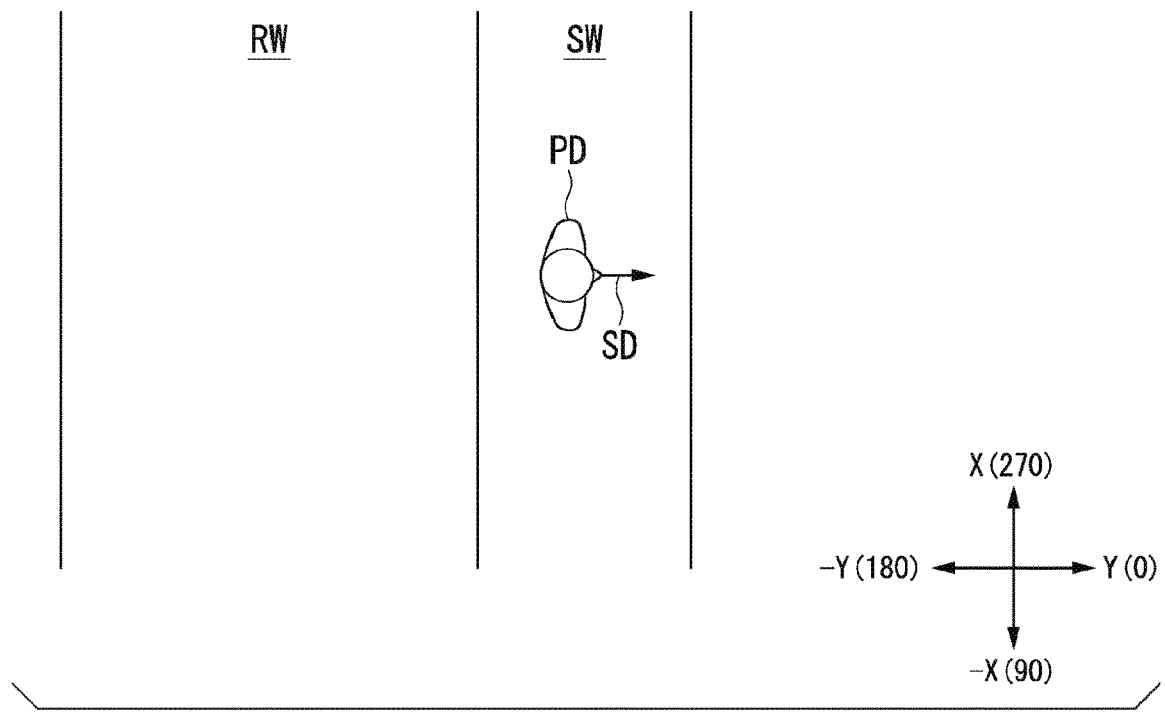
FIG. 5 is a diagram (part 3) for describing specific control.

FIG. 5 is a diagram (part 3) for describing specific control. Hereinafter, as shown in FIG. 5, a +Y direction may be referred to as zero degrees, a −X direction may be referred to as 90 degrees, a −Y direction may be referred to as 180 degrees, and a +X direction may be referred to as 270 degrees. For example, the controller 144 executes the specific control when a specific surface SD of the moving object is directed in a first predetermined direction. The first predetermined direction is any direction, for example, a range from 90 degrees to 270 degrees including zero degrees (without including 180 degrees), a range from 45 degrees to 315 degrees, or the like. The first predetermined direction may be a direction different from a direction of 180 degrees. The fact that the "pedestrian PD is rotating toward the reference position" indicates that the specific surface SD is rotating to be close to the direction of 180 degrees. The rotational speed is angular velocity of the specific surface SD.

Figure 6:
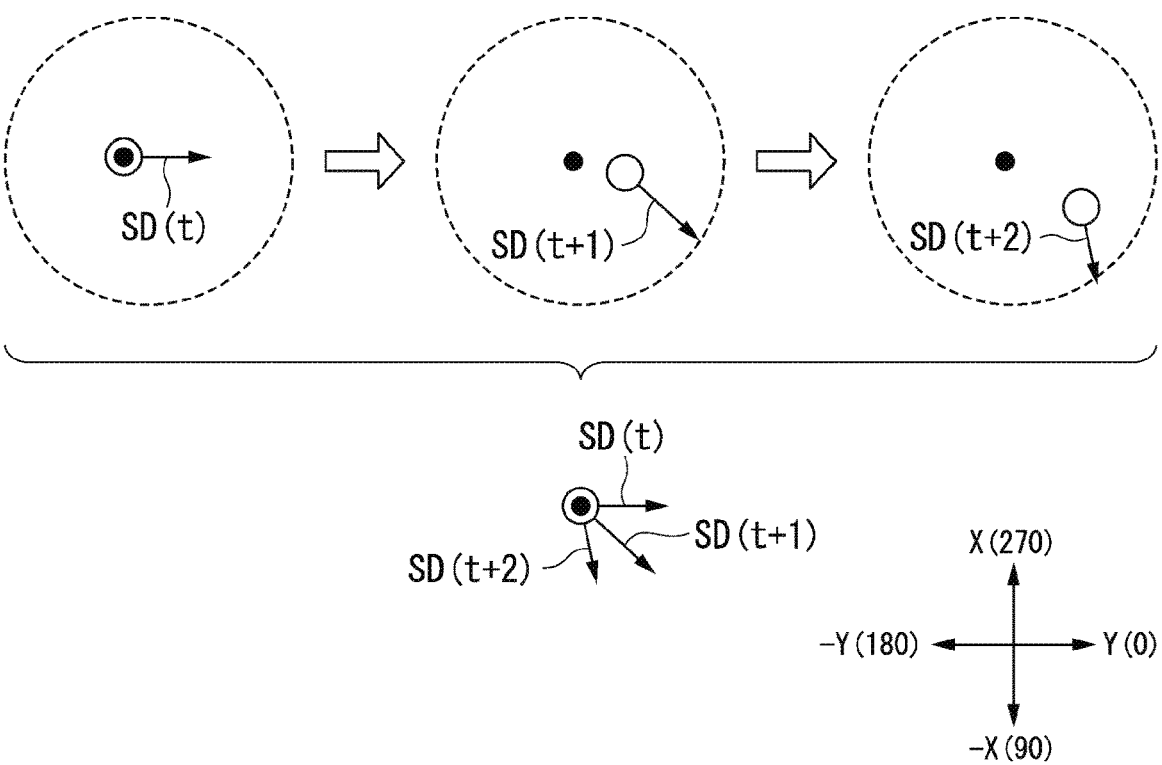
FIG. 6 is a diagram (part 4) for describing specific control.

When the pedestrian PD is rotating while moving, consideration may be given as follows. FIG. 6 is a diagram (part 4) for describing specific control. The processor 142 sets a set range (for example, a set range around the center of gravity) with respect to a reference point of the pedestrian PD. Even if the pedestrian PD is rotating while moving, the processor 142 sets the pedestrian PD as a target for the specific control when the reference point of the pedestrian PD is included within the set range. In this case, the processor 142 causes reference points of the pedestrian PD for specific surfaces SD(t) to SD(t+2) at times to match and obtains angular velocity of the specific surface SD on the basis of pedestrians PD(t) to PD(t+2).

Figure 7:
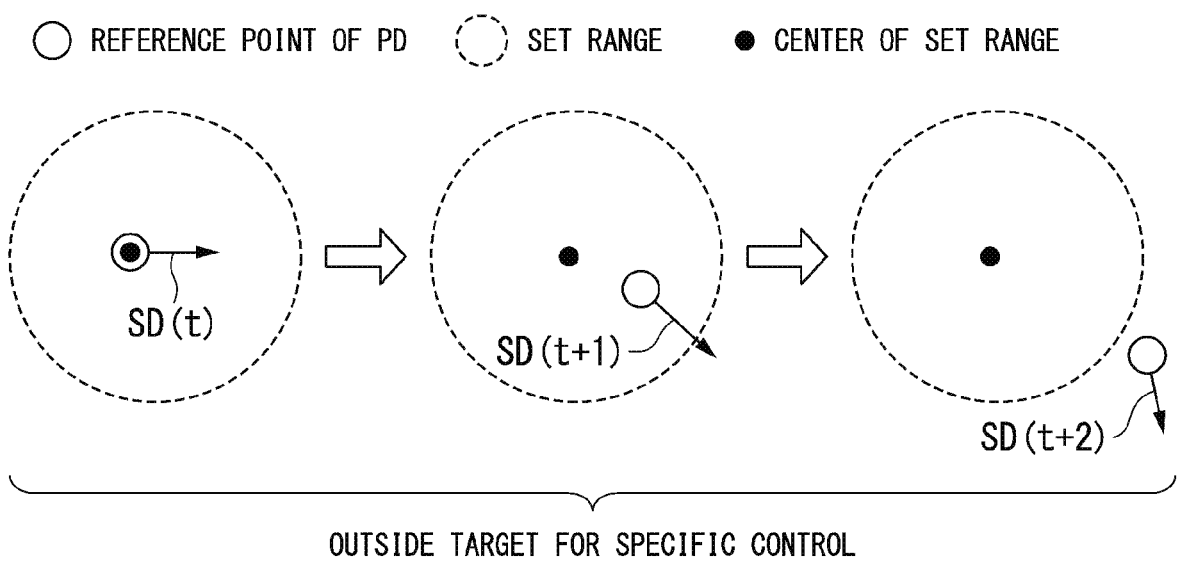
FIG. 7 is a diagram (part 5) for describing specific control.
Figure 7:
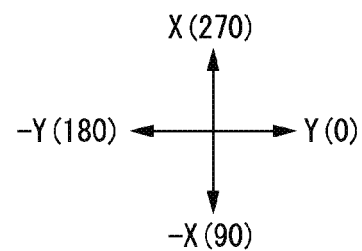

FIG. 7 is a diagram (part 5) for describing specific control. When the pedestrian PD rotates while moving and the reference point of the pedestrian PD is outside of the set range, the processor 142 may exclude the pedestrian PD from a target for the specific control. When deviation between a reference point of the pedestrian PD at a first time and a reference point of the pedestrian PD at a second time after the first time is greater than or equal to a predetermined degree, the processor 142 may exclude the pedestrian PD from the target for the specific control.

The pedestrian PD whose specific position SD is directed in a predetermined direction may be set as the target for the specific control. For example, the controller 144 does not have to execute the specific control for the pedestrian PD whose specific position SD is not directed in a second predetermined direction when another condition for executing the specific control is satisfied. The second predetermined direction is any direction and is, for example, a range from 90 degrees to 270 degrees including 180 degrees (without including zero degrees), a range from 135 degrees to 225 degrees, or the like. The second predetermined direction may be a direction different from a direction of zero degrees. That is, a pedestrian PD who has rotated at a speed greater than or equal to the threshold value without facing the roadway side may be excluded from the target for the specific control.

As described above, the controller 144 restricts access to a moving object when the moving object is rotating around a vertical axis at a speed greater than or equal to a threshold value so that a front surface of the moving object faces a reference position as compared with when the moving object is not rotating, thereby reliably controlling the vehicle according to a surrounding situation.

[Specific Control (Part 2)]

Figure 8:
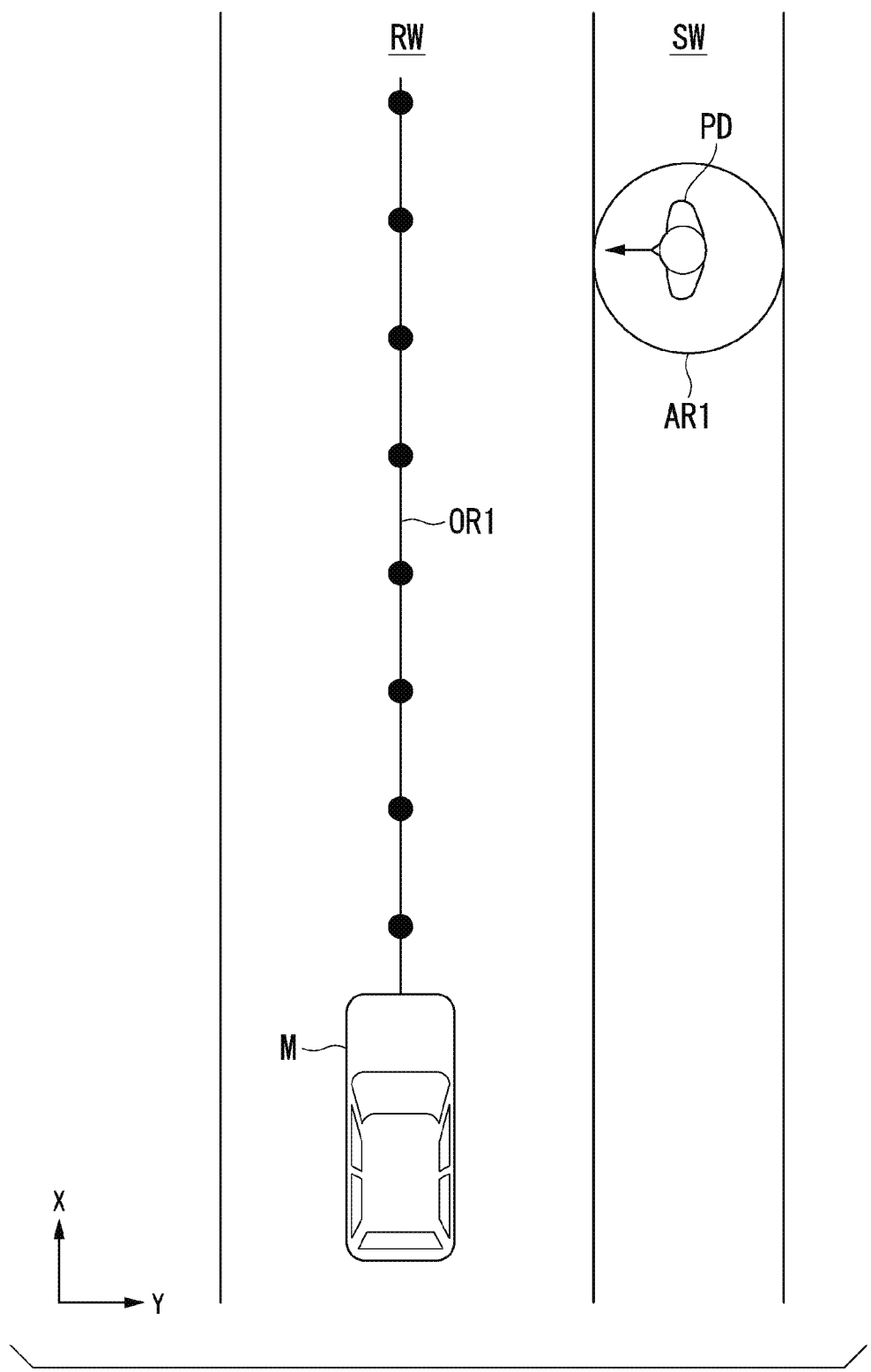
FIG. 8 is a diagram (part 6) for describing specific control.

FIG. 8 is a diagram (part 6) for describing specific control. In FIG. 8, it is assumed that the moving object has rotated at a rotational speed less than the threshold value or a specific position is directed in a reference position direction without rotation. When the moving object is rotating (or has rotated) toward a reference position present in the traveling direction of the host vehicle M at a speed less than the threshold value, the processor 142 sets a first risk area AR1 with respect to the moving object. For example, the first risk area AR1 is set to extend in the direction of the specific position.

Figure 9:
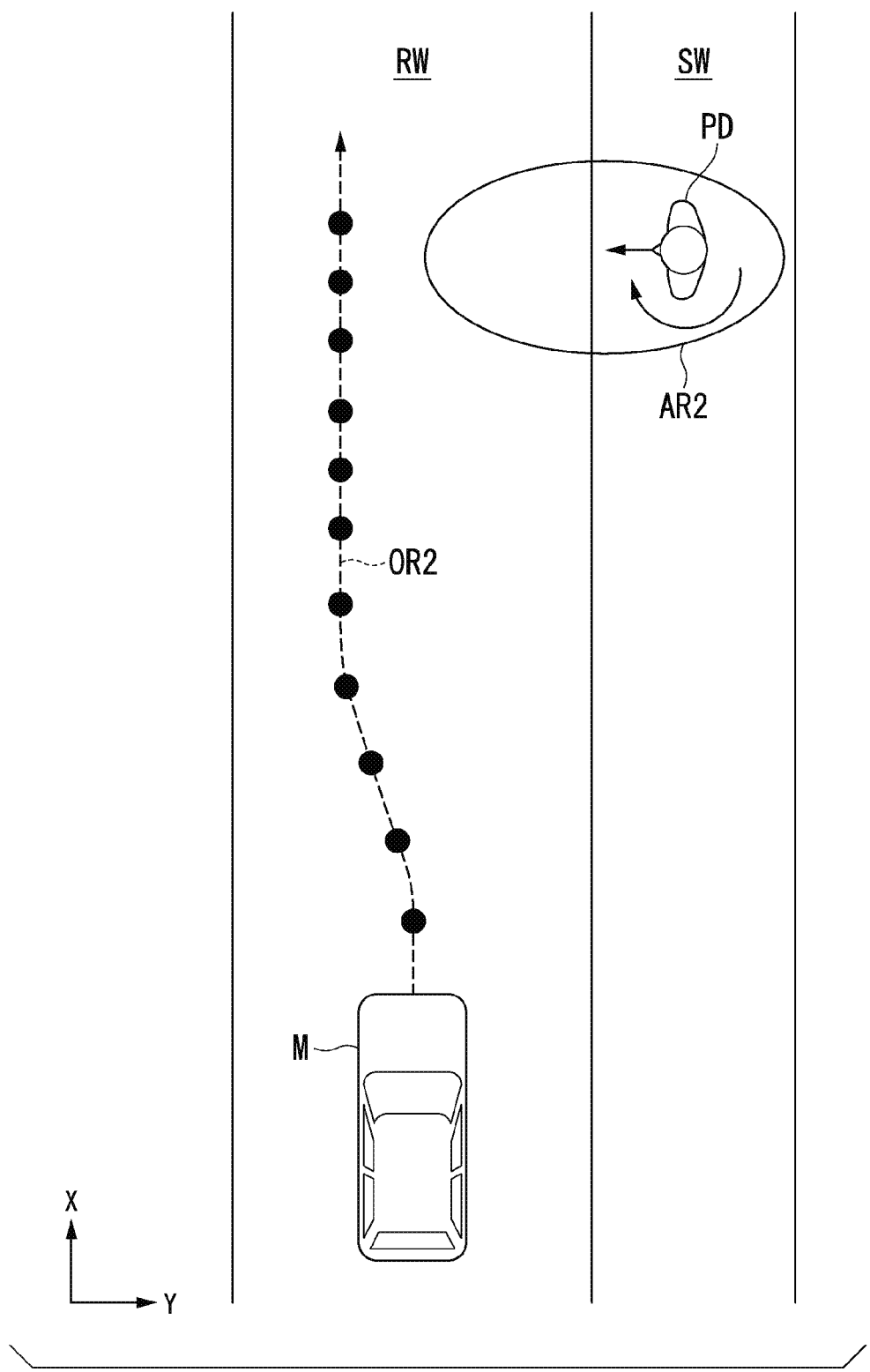
FIG. 9 is a diagram (part 7) for describing specific control.

FIG. 9 is a diagram (part 7) for describing specific control. In FIG. 9, it is assumed that the moving object has rotated at a rotational speed greater than or equal to the threshold value. When the moving object is rotating (has rotated) toward the reference position at a speed greater than or equal to the threshold value, the processor 142 sets a second risk area AR2 larger than the first risk area with respect to the moving object. For example, the second risk area AR2 is set to extend in the direction of the reference position. The second risk area AR is set to extend at least in a direction interfering with a position in the traveling direction of the host vehicle M. The second risk area AR2 is, for example, an area that includes the first risk area AR1 and extends toward the −Y direction side of the first risk area AR1.

Hereinafter, when the first risk area and the second risk area are not distinguished, they may be simply referred to as "risk areas."

The processor 142 may set the risk area (the first risk area or the second risk area) when the specific surface SD has been directed in a predetermined direction (for example, when the specific surface SD has reached a predetermined angle) and may set the first risk area even if the rotational speed of the specific surface SD is greater than or equal to the threshold value within a first angle range and set the second risk area AR2 when the specific surface SD is included in a second angle range (for example, when the specific surface SD has faced a roadway side). The processor 142 may set the second risk area AR2 when the rotational speed of the specific surface SD becomes greater than or equal to the threshold value before the specific surface SD enters the second angle range and may set the second risk area AR2 when the rotational speed of the specific surface SD becomes greater than or equal to the threshold value after the specific surface SD enters the second angle range.

The "risk area" is an area where risk potential is set. The "risk potential" is an index value indicating a risk level when the host vehicle M has entered the area where the risk potential is set. The risk potential is risk potential which is an index value of a predetermined magnitude (an index value exceeding zero). For example, the risk potential may be set so that a central point of the moving object is set to have a maximum value, a risk potential value decreases as a distance from the central point of the moving object increases, and the risk potential becomes zero when the host vehicle M is sufficiently away from the moving object. The automated driving control device 100 controls the host vehicle M so that the host vehicle M does not enter an area where the risk potential has been set (or an area having a predetermined value or more).

Figure 10:
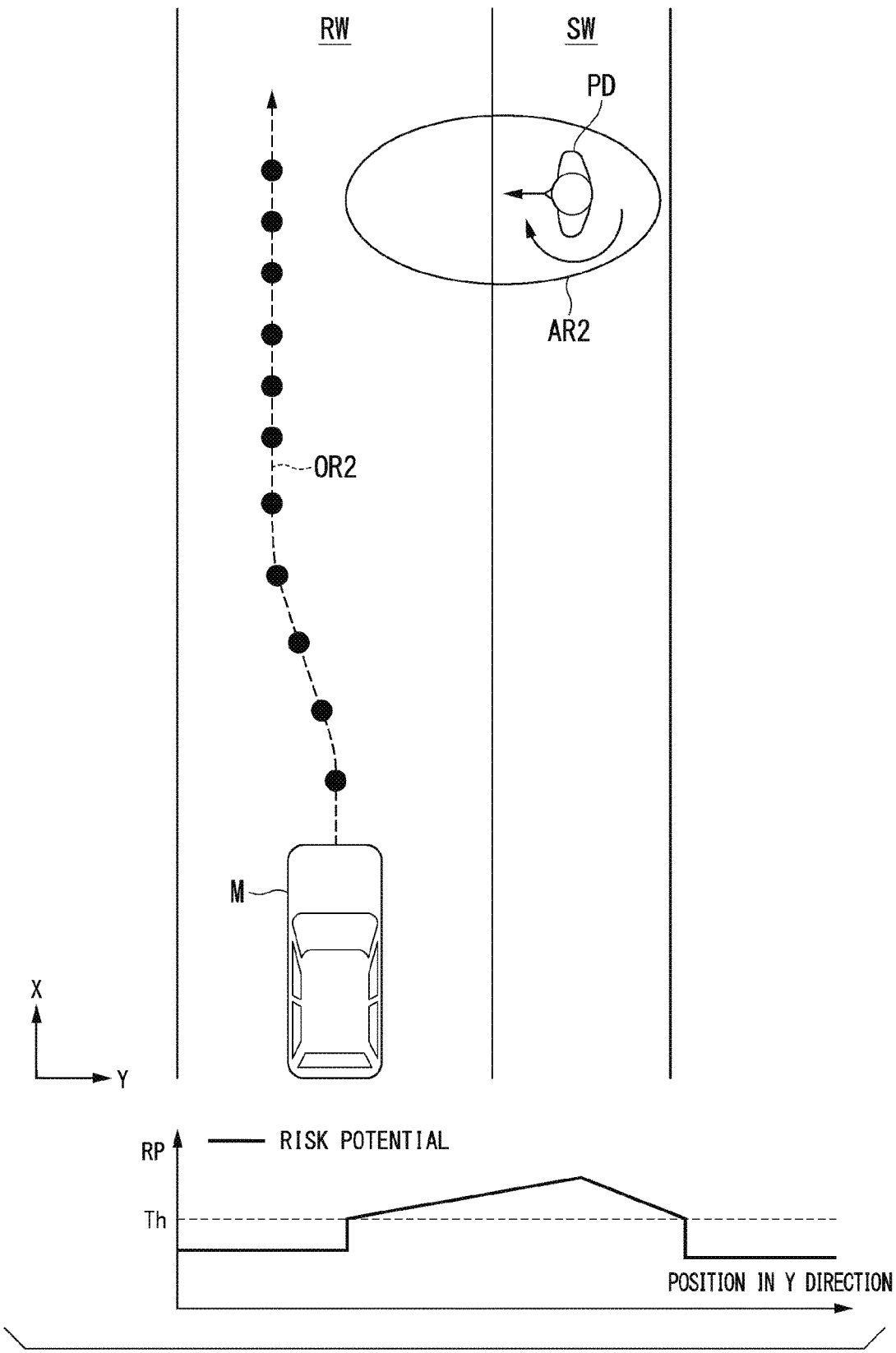
FIG. 10 is a diagram for describing risk potential.

FIG. 10 is a diagram for describing risk potential. For example, as shown in the lower part of FIG. 10, predetermined risk potential is set for the second risk area AR2. In the example of FIG. 10, a magnitude of the risk potential decreases as the host vehicle M moves away from the center of the pedestrian PD with respect to a position in the Y direction. In the example of FIG. 10, the magnitude of the risk potential set for the second risk area AR2 is greater than or equal to a threshold value Th. The threshold value Th is risk potential for preventing the host vehicle M from entering the second risk area AR2. The risk potential does not have to be set in an area different from the risk area (the index indicating the risk potential may be zero).

As described above, the automated driving control device 100 generates a trajectory so that the host vehicle M does not enter the second risk area AR2 and causes the host vehicle M to travel along the generated trajectory.

Figure 11:
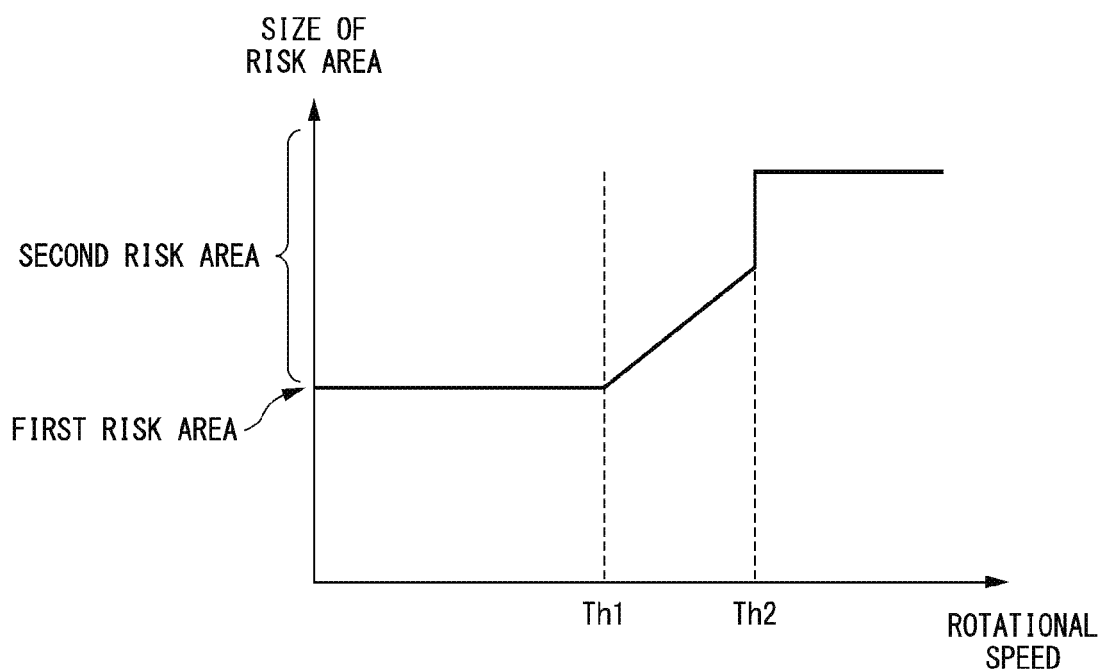
FIG. 11 is a diagram showing an example of a relationship between a rotational speed of a moving object and a size of a second risk area.

FIG. 11 is a diagram showing an example of a relationship between the rotational speed of the moving object and the size of the second risk area AR2. The vertical axis of FIG. 11 represents the size of the second risk area AR2 and the horizontal axis of FIG. 11 represents the rotational speed of the moving object. For example, the size of the second risk area AR2 may be set to increase as the rotational speed increases. For example, when the rotational speed is less than a threshold value Th1, the first risk area AR1 is set. The first risk area AR1 has a size S1. For example, in a range where the rotational speed is greater than or equal to the threshold value Th1 and is less than a threshold value Th2, the second risk area AR2 is set to increase as the rotational speed increases. For example, when the rotational speed is greater than or equal to the threshold value Th2, the size of the second risk area AR2 is set to a size S3. The above-described example is one example and a change in the size of the second risk area AR2 may be linear, non-linear, or stepwise.

Thus, the processor 142 changes the size of the risk area in accordance with the rotational speed of the specific surface SD of the moving object, so that it is possible to set a risk area more suitable for the rotation of the moving object in consideration of a risk due to the moving object.

[Specific Control (Part 3)]

Figure 12:
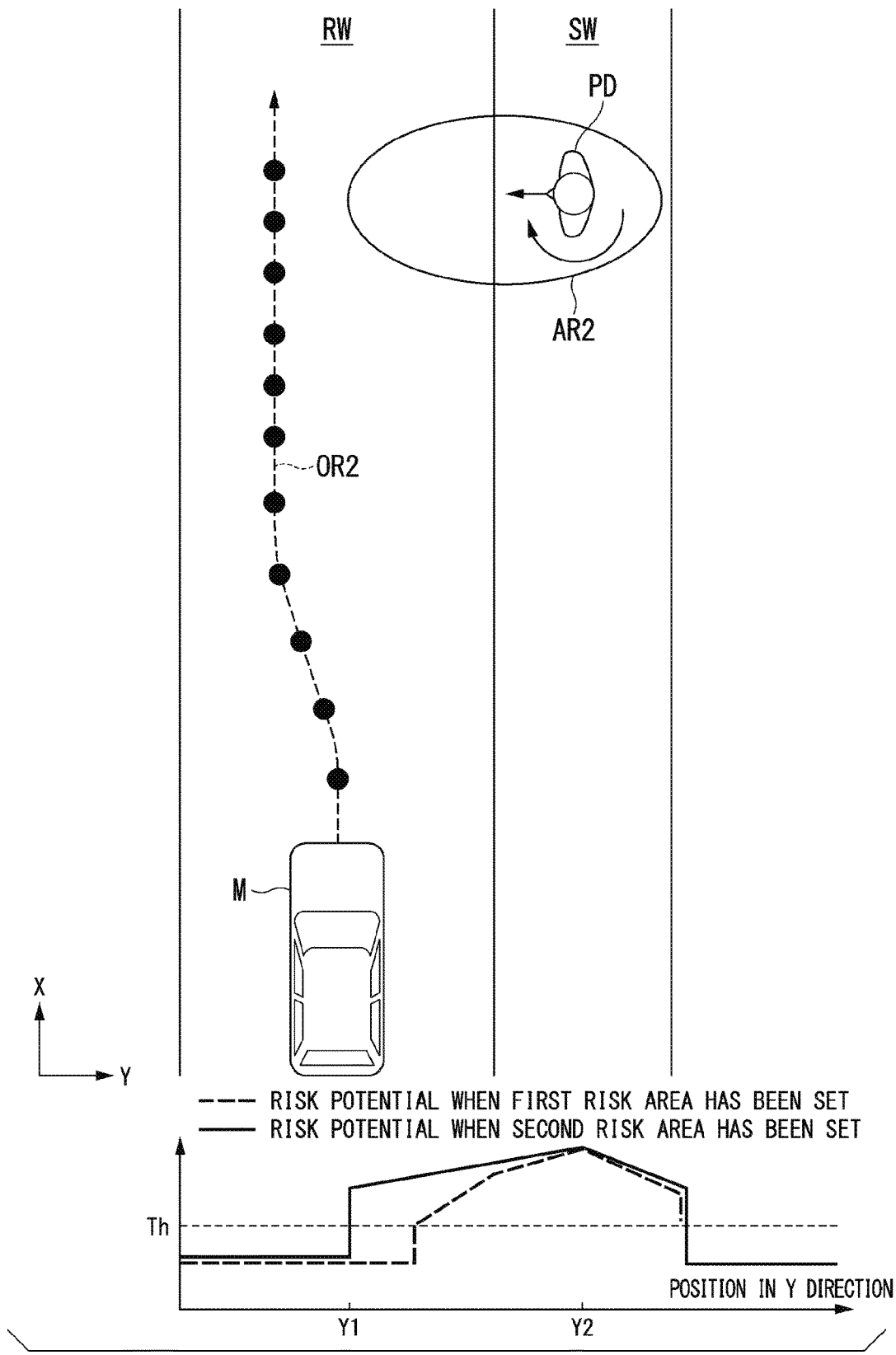
FIG. 12 is a diagram showing an example of a case in which a moving object has rotated at a rotation speed greater than or equal to a threshold value.

FIG. 12 is a diagram (part 7) for describing specific control. The processor 142 may set a first risk area associated with first risk potential with respect to the moving object when the moving object is rotating toward a reference position present in the traveling direction of the host vehicle M at a speed less than a threshold value and set a second risk area associated with second risk potential greater than the first risk potential with respect to the moving object when the moving object is rotating toward the reference position present in the traveling direction of the host vehicle M at a speed greater than or equal to the threshold value.

In FIG. 12, a case in which the moving object has rotated at a rotational speed greater than or equal to the threshold value is shown. As shown in FIG. 12, when the moving object has rotated at the rotational speed greater than or equal to the threshold value, the second risk potential is set for the second risk area AR2. The second risk potential is greater than the first risk potential in a predetermined range of positions in the Y direction (for example, a range between Y1 and Y2).

The processor 142 may change the magnitude of the second risk potential in accordance with the rotational speed of the moving object. For example, the processor 142 may increase the magnitude of the second risk potential as the rotational speed of the moving object increases.

The processor 142 may set the first risk area and increase the first risk potential set in the first risk area when the rotational speed of the moving object is greater than or equal to the threshold value. Also, in this case, likewise, the processor 142 may increase the magnitude of the first risk potential as the rotational speed of the moving object increases.

The processor 142 may set the risk area or the risk potential on the basis of the presence or absence of a physical object (for example, an obstacle) between the reference position and the pedestrian PD. The "physical object" is a physical object (hereinafter referred to as an obstacle) that becomes an obstacle when the pedestrian PD moves in the reference position direction. The obstacle is, for example, a guardrail, a curb, a bicycle, a signboard, a pylon, or the like.

Figure 13:
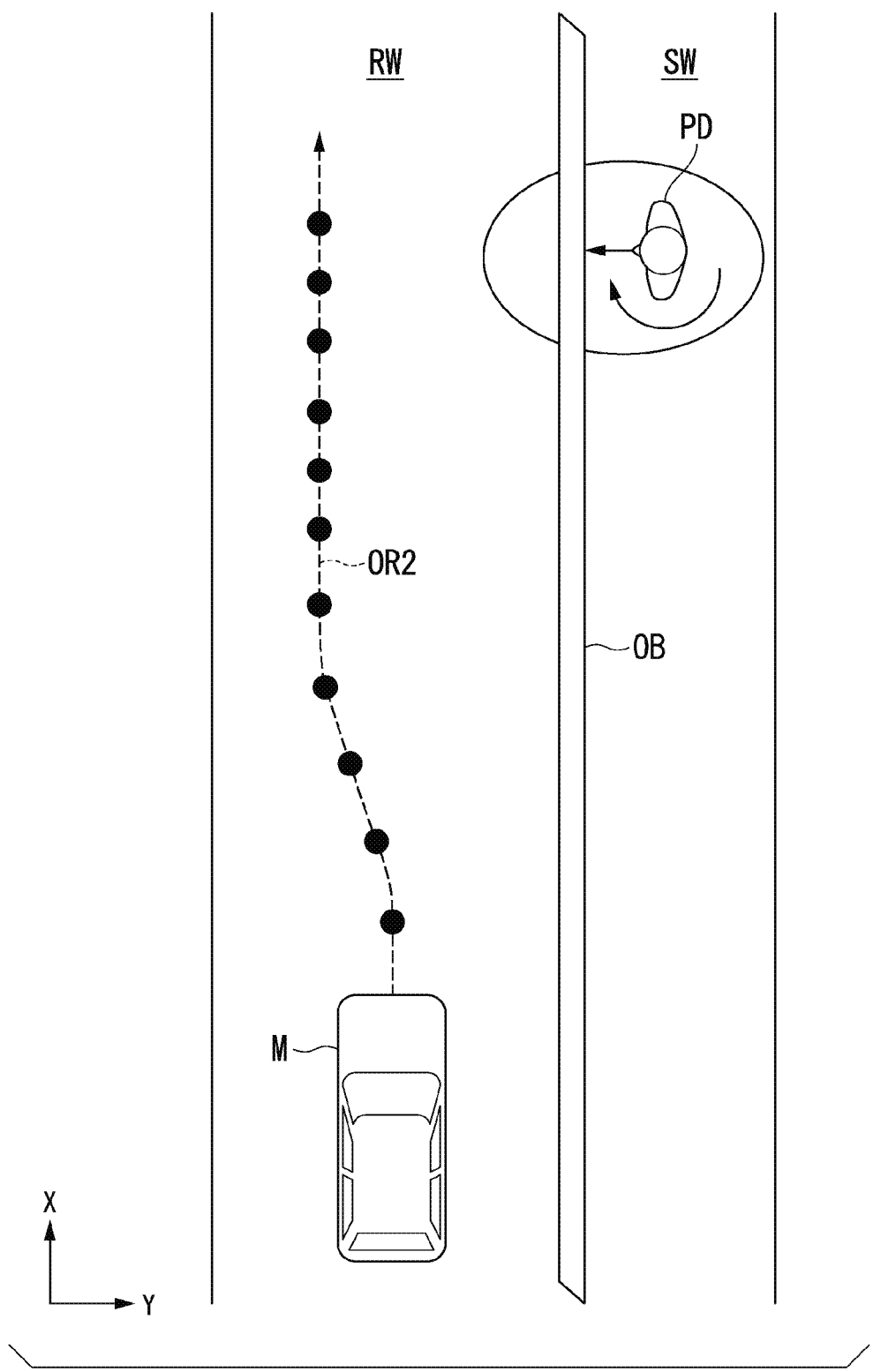
FIG. 13 is a diagram showing an example of a scene in which there is an obstacle.

FIG. 13 is a diagram showing an example of a scene in which there is an obstacle. For example, when an obstacle OB is present, the processor 142 may set a first risk area without setting a second risk area even if the rotational speed of the moving object is greater than or equal to the threshold value or may set a risk area smaller than the second risk area.

Figure 14:
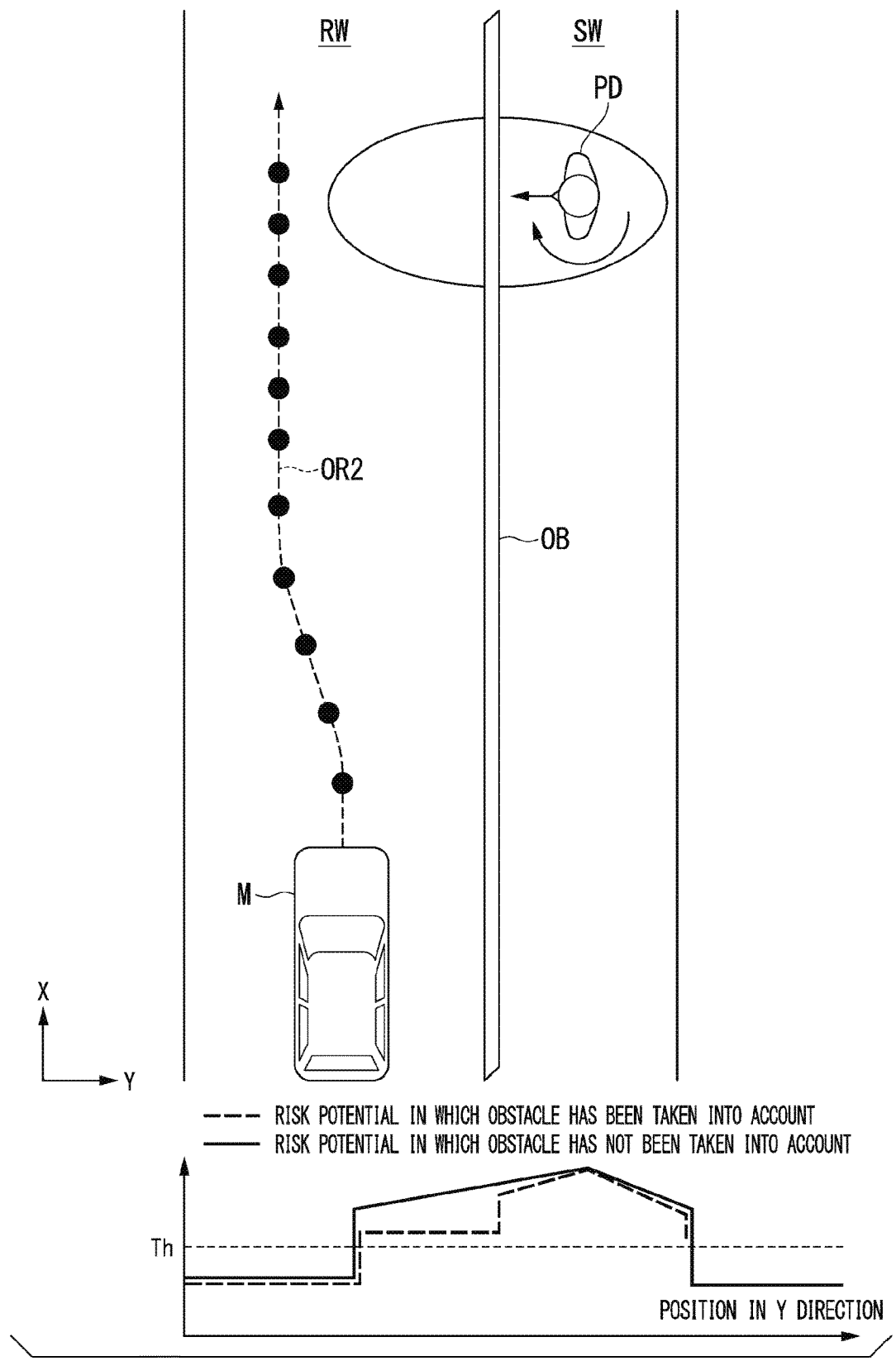
FIG. 14 is a diagram showing an example of a scene in which second risk potential is reduced.

For example, the processor 142 may cause the second risk potential to be set in the second risk area when the obstacle OB is present less than the second risk potential to be set in the second risk area when the obstacle OB is not present. FIG. 14 is a diagram showing an example of a scene in which the second risk potential is reduced. For example, as shown in the lower part of FIG. 14, when the obstacle OB is present, for example, the processor 142 makes the second risk potential between the obstacle OB and the reference position less than the second risk potential when the obstacle OB is not present.

Figure 15:
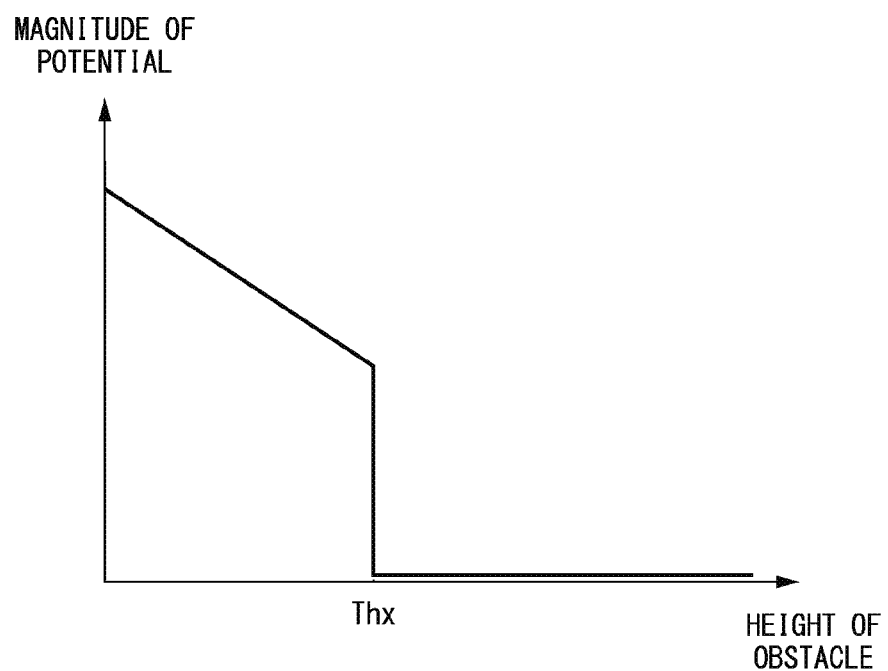
FIG. 15 is a diagram showing an example of the relationship between a height of an obstacle and risk potential.

FIG. 15 is a diagram showing an example of a relationship between a height of an obstacle and risk potential. The vertical axis of FIG. 15 represents a magnitude of the risk potential and the horizontal axis of FIG. 15 represents the height of the obstacle. For example, the magnitude of the risk potential is a magnitude of the second risk potential at a predetermined position between the obstacle OB and the reference position or an average of magnitudes of second risk potentials between the obstacle OB and the reference position. For example, in a range of the height of the obstacle from zero to a threshold value Thx, the magnitude of the second risk potential decreases as the height of the obstacle increases. When the height of the obstacle exceeds the threshold value Thx, for example, the level of the second risk potential becomes zero or a predetermined value or less.

Figure 16:
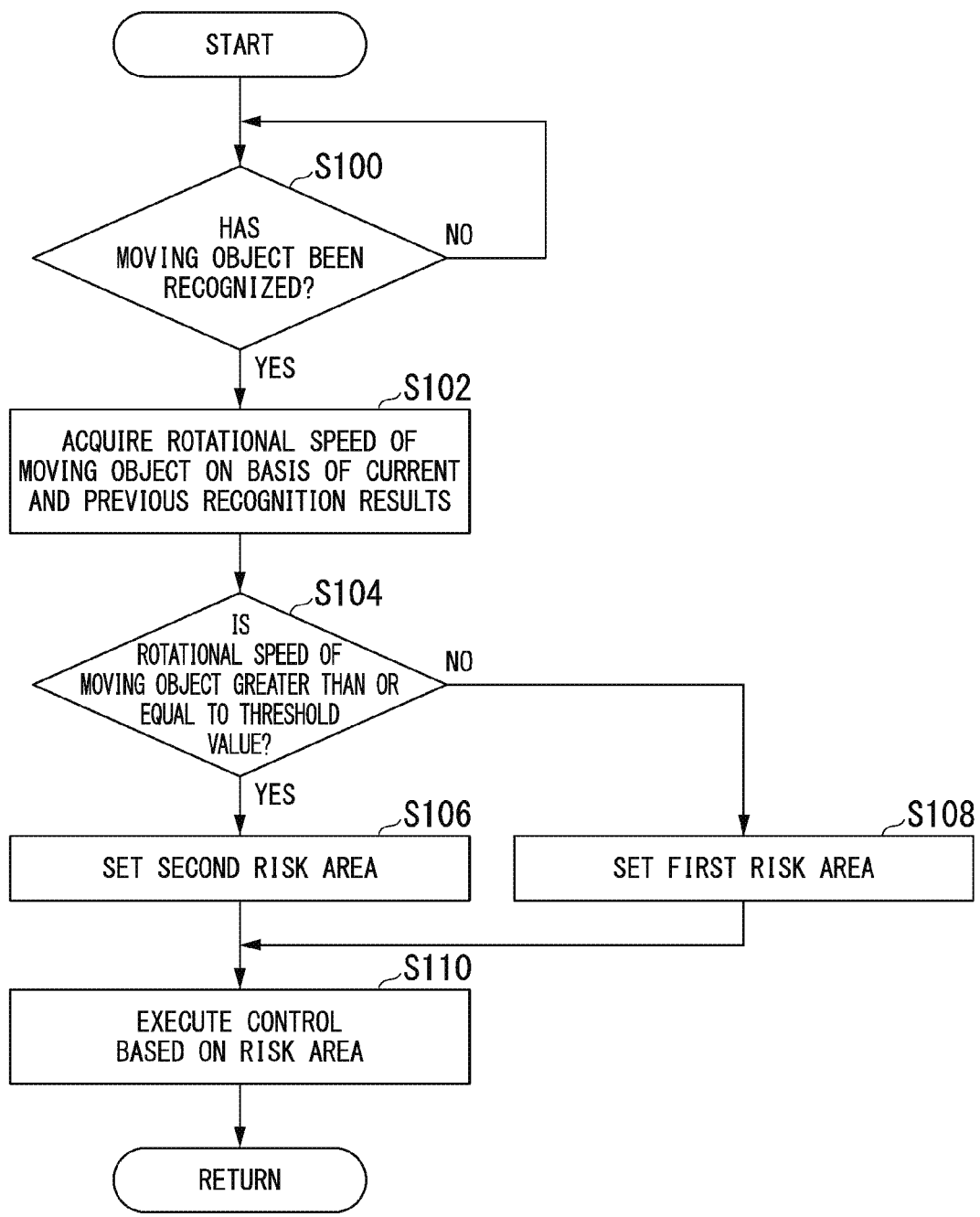
FIG. 16 is a flowchart showing an example of a flow of a process executed by an automated driving control device.

Thus, the processor 142 can reliably control the host vehicle M according to a surrounding environment by setting the risk potential in consideration of a possibility that the moving object will move in a direction interfering with the traveling direction of the host vehicle M. [Flowchart] FIG. 16 is a flowchart showing an example of a flow of a process executed by the automated driving control device 100. First, the processor 142 determines whether or not a moving object around the host vehicle M has been recognized (step S100). When a moving object around the host vehicle M has been recognized, the processor 142 calculates a rotational speed of the moving object on the basis of current and previous recognition results of the moving object and acquires the rotational speed (step S102). When a moving object has not been previously recognized, the process of one routine of the present flowchart ends.

Next, the processor 142 determines whether the rotational speed of the moving object is greater than or equal to a threshold value (step S104). When the rotational speed of the moving object is greater than or equal to the threshold value, the processor 142 sets the second risk area where the second risk potential is set (step S106). When the rotational speed of the moving object is less than the threshold value, the processor 142 sets the first risk area where the first risk potential is set (step S108). After the processing of step S106 or step S108, the controller 144 restricts the host vehicle M so that the risk area set in step S106 or step S108 is avoided (step S110). Thereby, the process of one routine of the present flowchart ends.

As described above, as the automated driving control device 100, for example, the vehicle control device can also control the vehicle while paying sufficient attention to a moving object that is likely to have access in a direction in which the moving object will interfere with the host vehicle M by making a sudden direction change.

The controller 144 further restricts the access of the vehicle to the moving object in consideration of at least one of a type of the moving object, a rotation direction of the moving object, and a physical object (the above-described obstacle) present in the rotation direction of the moving object when the moving object is rotating around the vertical axis at the speed greater than or equal to the threshold value as compared with when the moving object is not rotating around the vertical axis at the speed greater than or equal to the threshold value. The type of the moving object is a type such as a pedestrian, a wheelchair, or a unicycle. The type of the moving object is whether the moving object (or a person on the moving object) is an adult or a child, the age of the person, or the like. For example, the recognizer 130 recognizes the type of the moving object by performing image processing. The rotation direction of the moving object is a rotation direction for passing in front of the host vehicle M or a rotation direction opposite thereto.

For example, when the moving object is a child, the risk area or the risk potential is set to be greater than when the moving object is an adult. When the moving object is in a rotation direction for passing the front surface of the host vehicle M, the risk area or the risk potential is set to be greater than when the moving object is rotating in a direction opposite thereto. Thus, the processor 142 increases the risk for the moving object when there is a greater expectation that the moving object will perform movement interfering with the traveling direction of the host vehicle M. As a result, the automated driving control device 100 can reliably control the host vehicle M according to a surrounding environment.

According to the embodiment described above, the controller 144 restricts access to the moving object when the moving object is rotating around a vertical axis at a speed greater than or equal to a threshold value so that a front surface of the moving object recognized by the recognizer 130 faces a position interfering with a position in a traveling direction of the host vehicle M as compared with when the moving object is not rotating, so that it is possible to reliably control the vehicle according to a surrounding environment. [Hardware Configuration]

Figure 17:
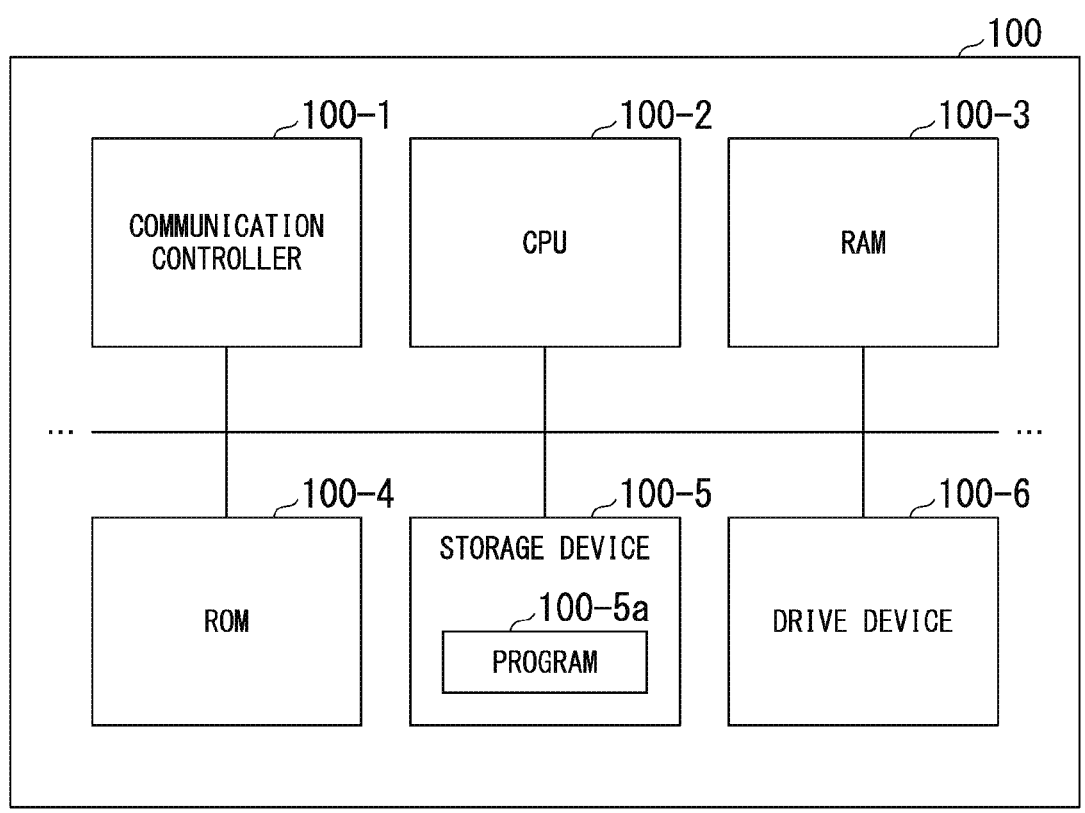
FIG. 17 is a diagram showing an example of a hardware configuration of an automated driving control device according to an embodiment.

FIG. 17 is a diagram showing an example of a hardware configuration of the automated driving control device 100 according to the embodiment. As shown in FIG. 17, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or an HDD, a drive device 100-6, and the like are mutually connected by an internal bus or a dedicated communication line. The communication controller 100-1 communicates with components other than the automated driving control device 100. The storage device 100-5 stores a program 100-5*a* to be executed by the CPU 100-2. This program is loaded into the RAM 100-3 by a direct memory access (DMA) controller (not shown) or the like and executed by the CPU 100-2. Thereby, some or all of the recognizer 130, the processor 142, and the controller 144 are implemented.

The above-described embodiment can be implemented as follows.

A vehicle control device including:

a storage device storing a program; and a hardware processor, wherein the hardware processor executes the program stored in the storage device to:

recognize a surrounding environment of a vehicle including a moving object present around the vehicle;

control at least one of a speed and steering of the vehicle; and restrict access to the moving object when the moving object is rotating around a vertical axis at a speed greater than or equal to a threshold value so that a front surface of the moving object that has been recognized faces a position interfering with a position in a traveling direction of the vehicle as compared with when the moving object is not rotating.

Although modes for carrying out the present invention have been described using embodiments, the present invention is not limited to the embodiments and various modifications and substitutions can also be made without departing from the scope and spirit of the present invention.

What is claimed is:

1. A vehicle control device comprising:
a hardware processor executing software, hardware including circuitry, or a cooperation of the software and the hardware configured to operate as:
a recognizer configured to recognize a surrounding environment of a vehicle including a moving object present around the vehicle;
a controller configured to control at least one of a speed and steering of the vehicle, and
a setter configured to set a risk area in a surrounding area of the vehicle on the basis of a recognition result of the recognizer,
wherein the controller restricts access to the moving object when the moving object is rotating around a vertical axis at a speed greater than or equal to a threshold value so that a front surface of the moving object recognized by the recognizer faces a position interfering with a position in a traveling direction of the vehicle as compared with when the moving object is not rotating around the vertical axis at a speed greater than or equal to a threshold value,
wherein the setter sets a first risk area with respect to the moving object when the moving object is rotating toward a reference position present in the traveling direction of the vehicle at a speed less than the threshold value or is not rotating toward the reference position,
wherein the setter sets a second risk area larger than the first risk area with respect to the moving object when the moving object is rotating toward the reference position present in the traveling direction of the vehicle at a speed greater than or equal to the threshold value, and
wherein the controller controls the vehicle so that the vehicle does not access the first risk area or the second risk area.

2. A vehicle control device comprising:
a hardware processor executing software, hardware including circuitry, or a cooperation of the software and the hardware configured to operate as:
a recognizer configured to recognize a surrounding environment of a vehicle including a moving object present around the vehicle;
a controller configured to control at least one of a speed and steering of the vehicle, and
a setter configured to set a risk area in a surrounding area of the vehicle on the basis of a recognition result of the recognizer,
wherein the controller restricts access to the moving object when the moving object is rotating around a vertical axis at a speed greater than or equal to a threshold value so that a front surface of the moving object recognized by the recognizer faces a position interfering with a position in a traveling direction of the vehicle as compared with when the moving object is not rotating around the vertical axis at a speed greater than or equal to a threshold value,
wherein the setter sets a first risk area associated with first risk potential with respect to the moving object when the moving object is rotating toward a reference position present in the traveling direction of the vehicle at a speed less than the threshold value or is not rotating toward the reference position,
wherein the setter sets a second risk area associated with second risk potential greater than the first risk potential with respect to the moving object when the moving object is rotating toward the reference position present in the traveling direction of the vehicle at a speed greater than or equal to the threshold value, and
wherein the controller controls the vehicle so that the vehicle does not access the first risk area or the second risk area.

3. The vehicle control device according to claim 1, wherein the setter sets the first risk area and the second risk area so that the first risk area and the second risk area extend in at least a direction interfering with the position in the traveling direction of the vehicle.

4. A vehicle control device comprising:
a hardware processor executing software, hardware including circuitry, or a cooperation of the software and the hardware configured to operate as:
a recognizer configured to recognize a surrounding environment of a vehicle including a moving object present around the vehicle; and
a controller configured to control at least one of a speed and steering of the vehicle,
wherein the controller restricts access to the moving object when the moving object is rotating around a vertical axis at a speed greater than or equal to a threshold value so that a front surface of the moving object recognized by the recognizer faces a position interfering with a position in a traveling direction of the vehicle as compared with when the moving object is not rotating around the vertical axis at a speed greater than or equal to a threshold value,
wherein the controller further restricts the access of the vehicle to the moving object in consideration of at least one of a type of the moving object, a rotation direction of the moving object, and a physical object present in the rotation direction of the moving object when the moving object is rotating around the vertical axis at a speed greater than or equal to the threshold value so that the front surface of the moving object faces the position interfering with the position in the traveling direction of the vehicle, as compared with when the moving object is not rotating around the vertical axis at a speed greater than or equal to the threshold value.

* * * * *